(12) United States Patent
Plessier

(10) Patent No.: US 6,212,538 B1
(45) Date of Patent: Apr. 3, 2001

(54) METHOD FOR THE PERFORMANCE OF AN INTEGER DIVISION WITH A MODULAR ARITHMETIC COPROCESSOR

(75) Inventor: Bernard Plessier, Aix en Provence (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/143,292

(22) Filed: Aug. 28, 1998

(30) Foreign Application Priority Data

Sep. 9, 1997 (FR) .................................................. 97 11342

(51) Int. Cl.⁷ ........................................................ G06F 7/00
(52) U.S. Cl. ................................................................ 708/492
(58) Field of Search .................................. 708/491–492; 380/28

(56) References Cited

U.S. PATENT DOCUMENTS 5,751,620 * 5/1998 Monier .................................. 708/442
5,999,953 * 12/1999 Monier .................................. 708/492

FOREIGN PATENT DOCUMENTS

97/25668 7/1997 (WO) .................................. G06F/7/72

* cited by examiner

*Primary Examiner*—Tan V. Mai
(74) *Attorney, Agent, or Firm*—Theodore E. Galanthay; Allen, Dyer, Doppelt, Milbrath & Gilchrist, P.A.

(57) ABSTRACT

A division method and division circuit that can be integrated into a modular arithmetic coprocessor performs a reversal by word for the dividend and the quotient. This is done using a plurality of registers.

30 Claims, 2 Drawing Sheets

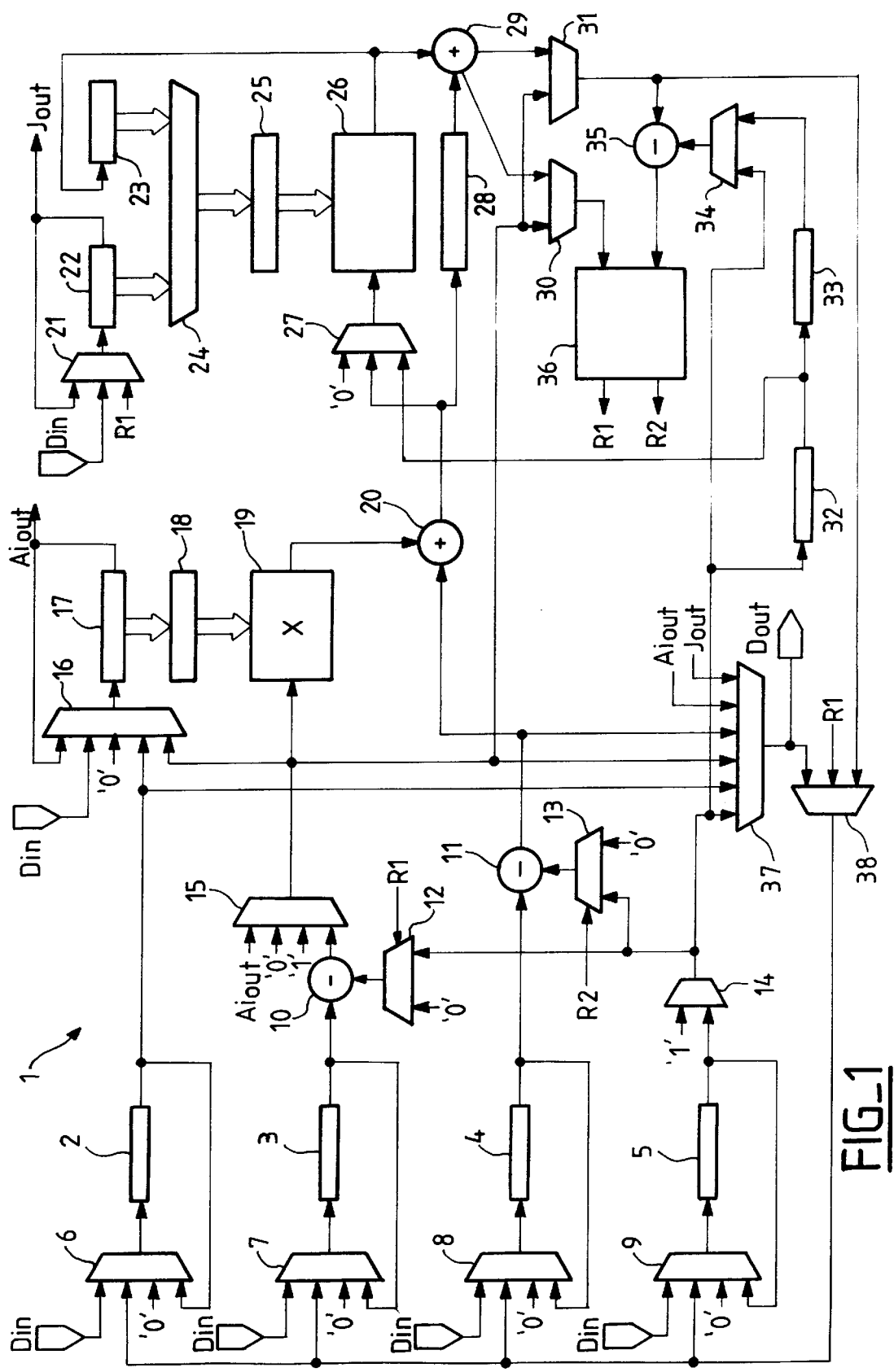
FIG_1

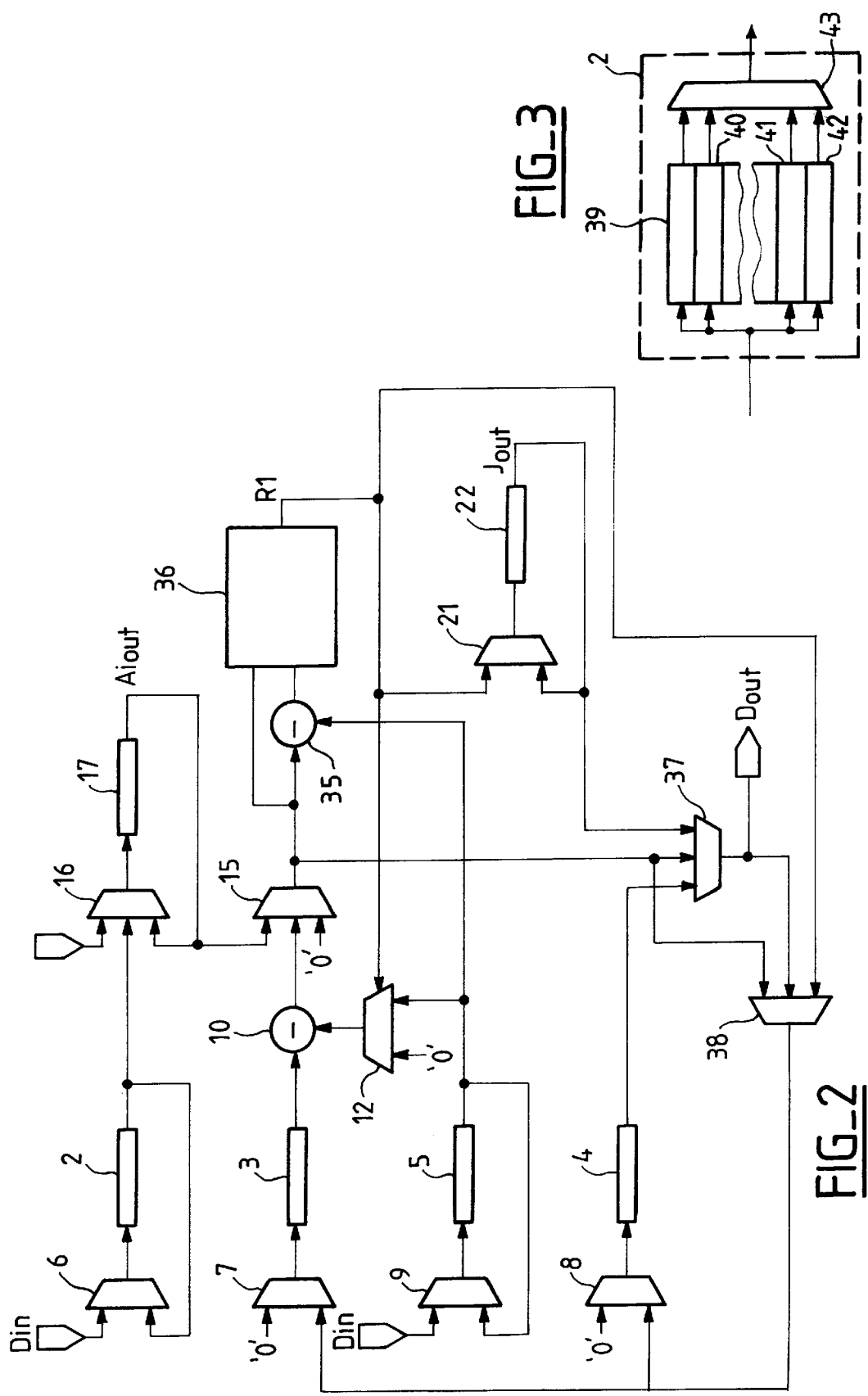

METHOD FOR THE PERFORMANCE OF AN INTEGER DIVISION WITH A MODULAR ARITHMETIC COPROCESSOR

FIELD OF THE INVENTION

The invention relates to methods for performing certain mathematical operations, and, more particularly, to a method for the performing of an integer division with a modular arithmetic coprocessor.

BACKGROUND OF THE INVENTION

Modular arithmetic coprocessors are typically used in encryption and/or decryption circuits. The use of these coprocessors enables a considerable acceleration of encryption and/or decryption operations using the Montgomery method. Such systems are commonly used in chip cards employing, in particular, the RSA code.

The RSA code is a form of mathematical encoding where a binary message M encoded on N bits is processed as an integer of n bits. The encryption and decryption are done by operations of modular exponentiation:

encryption: $M'=M^e$ mod N, decryption: $M=M'^d$ mod N.

Where M' is the encrypted message encoded on n bits, N is an integer encoded on n bits such that $N=p*q$, and p and q are two integers. The exponents e and d are two integers such that $(e*d)$ mod $\Phi(N)=1$, with $\Phi(N)=(p-1)*(q-1)$. A code of this kind therefore has two keys, one encryption key called a public key (e and N) and the other a decryption key called a secret key (d and N).

To find the secret key from the public key, it is enough to carry out the following operation: $d=(1+K*\Phi(N))/e$, with K being an integer coefficient that is not zero. The security of a code of this kind lies in the complexity of the operations to be performed. To find the secret key, it is necessary to split up N into prime numbers. This requires a period of time that becomes greater as the numbers p and q are increased (p and q are encoded on several hundreds of bits). Indeed, it is necessary to test, successively, the divisibility of N by all the integers encoded on 2 to n/2 bits.

It is quite possible to find out the secret key from the public key, provided that several hundreds of years are spent for this purpose. However, certain uses of RSA codes may require changes of keys that make use of a computation of keys. Such computations may make use of divisions on large numbers.

In chip cards, the encryption circuits make use of a microprocessor-coprocessor type architecture. The microprocessor is a standard 8-bit or 16-bit microprocessor. The coprocessor is a modular arithmetic coprocessor especially designed to carry out computations on large numbers. The document EP-A 601,907 discloses a modular arithmetic coprocessor using a serial architecture that is particularly well suited to chip cards. This particularly well suited coprocessor has been used as a basis for several improvements, and especially for the patent application PCT/FR 97/00035.

The patent application PCT/FR 97/00035 discloses a possible performance of an integer division using the modular arithmetic coprocessor. However, the division made requires a reversal of bits on large-sized words for the dividend and the quotient. The reversal is done at present by a processor which works jointly with the coprocessor and requires, firstly, substantial memory space and, secondly, substantial computation time.

SUMMARY OF THE INVENTION

The invention proposes to resolve the problems raised by the prior art. The invention proposes a new division circuit that can be integrated into the modular arithmetic coprocessor disclosed in the document EP-A 601,907 for which it is planned to have a data reversal that is achieved internally.

An object of the invention is a method for the implementation of an integer division in a modular arithmetic coprocessor. The division relates to a dividend A, encoded on $\alpha$ words of Bt bits, divided by a divider N, encoded on n words of Bt bits, to obtain a quotient S, encoded on $\alpha-n+1$ words of Bt bits. At least one word of Bt bits of the dividend A is entered bit-by-bit into a Bt bit dividend shift register in a first order, and is output from the dividend register bit-by-bit in an order that is the reverse of the first order; and/or in which at least one Bt word of the quotient S is entered bit-by-bit into a quotient register in a defined order, and is output bit-by-bit in an order that is the reverse of the defined order.

Preferably, the dividend register performs a Bt−1 bit shift Bt times by having its input connected to its output. Thus, the contents of the dividend register are output bit-by-bit after each of the shifts by Bt−1 bits. The quotient register performs a shift of Bt−1 bits Bt times, the first shift bringing about the entry of one bit of the quotient S and the output of the quotient register being connected to the input of the quotient register during the Bt−2 following shifts.

In one variant, the dividend and quotient registers receive, successively and respectively, Bt bit words of the dividend A and the $\alpha-n+1$ Bt bit words of the quotient S. Each of the words has a lower place value than the previously received word. In another variant, several Bt bit dividend and quotient registers each receive, respectively, a Bt bit word of the dividend A and of the quotient S.

An object of the invention is also a modular arithmetic coprocessor comprising a division circuit to carry out an integer division of a dividend A, encoded on $\alpha$ words of Bt bits, by a divider N, encoded on n words of Bt bits, to obtain a quotient S, encoded on $\alpha-n+1$ words of Bt bits. The coprocessor comprises at least one Bt bit dividend shift register to contain at least one word of the dividend A to be able to enter the word of a dividend A in a first order, and to output the word of the dividend A in an order that is the reverse of the first order; and/or wherein it comprises at least one Bt bit quotient shift register to contain at least one word of the quotient S to be able to enter the word of the quotient S in a defined order, and output the word of the quotient S in an order that is the reverse of the defined order.

Preferably, the coprocessor has a dividend multiplexer and/or a quotient multiplexer to connect the output of the dividend register and/or the quotient register, respectively, to the input of the dividend register and/or the input of the quotient register to reverse the order of output of the bits contained in the dividend register and/or in the quotient register by rotation of the contents of the dividend register and/or the quotient register.

BRIEF DESCRIPTION OF THE DRAWINGS

The invention will be understood more clearly and other particular features and advantages shall appear from the following description made with reference to the appended drawings, of which:

FIG. 1 shows the modular coprocessor according to the invention;

FIG. 2 shows the division circuit according to the invention; and

FIG. 3 shows a register for the invention.

DETAILED DESCRIPTION OF THE PREFERRED EMBODIMENTS

The coprocessor 1 of FIG. 1 comprises:

first to fourth registers 2 to 5, the registers 2 to 5 being k*Bt bit shift registers, each comprising a series input and a series output;

first to fourth multiplexers 6 to 9, each having first to fourth inputs and one output, the output of each of the first to fourth multiplexers 6 to 9 being respectively connected to the input of the first to fourth registers 2 to 5, the first input of each of the first to fourth multiplexers 6 to 9 being respectively connected to the output of the first to fourth registers 2 to 5, the second input of the multiplexers 6 to 9 receiving a logic "0", the third input of the multiplexers 6 to 9 being connected to a series input terminal Din;

first and second subtraction circuits 10 and 11, each having first and second inputs and one output, the first input of the first and second subtraction circuits 10 and 11 being respectively connected to the output of the second and third registers 3 and 4;

fifth and sixth multiplexers 12 and 13, each having one output, first and second bit inputs and one selection input, the output of the fifth and sixth multiplexers 12 and 13 being respectively connected to the second input of the first and second subtraction circuits 10 and 11, the first bit input of the multiplexers 12 and 13 receiving a logic "0";

a seventh multiplexer 14 having first and second inputs and one output, the first input being connected to the output of the fourth register 5, the second input receiving a logic "1", and the output being connected to the second bit inputs of the fifth and sixth multiplexers 12 and 13;

an eighth multiplexer 15 having first to fourth inputs and one output, the first input being connected to the output of the first subtraction circuit 10, the second input receiving a logic "1", the third input receiving a logic "0";

a ninth multiplexer 16 having first to fifth inputs and one output, the first input being connected to the output of the eighth multiplexer 15, the second input being connected to the output of the first register 2, the third input receiving a logic "0", the fourth input being connected to the input terminal Din;

a fifth register 17 that is a Bt bit shift register having one serial input, one serial output and one parallel output, the serial input being connected to the output of the ninth multiplexer 16, the serial output being connected to the fifth input of the multiplexer 16 and to the fourth input of the eighth multiplexer 15;

a sixth Bt bit register 18 having one parallel input and one parallel output, the parallel input being connected to the parallel output of the fifth register 17;

a first multiplication circuit 19 having one series input, one parallel input and one series output, the series input being connected to the output of the eighth multiplexer 15, the parallel input being connected to the parallel output of the sixth register 18;

a first addition circuit 20 having first and second inputs and one output, the first input being connected to the output of the second subtraction circuit 11, the second input being connected to the series output of the multiplication circuit 19;

a tenth multiplexer 21 having first to third inputs and one output, the first input being connected to the input terminal Din;

a seventh Bt bit shift register 22 having one series input, one series output and one parallel output, the series input being connected to the output of the tenth multiplexer 21, the series output being connected to the second input of the multiplexer 21;

an eighth Bt bit shift register 23 having one series input and one parallel output;

an eleventh multiplexer 24 having first and second parallel inputs and one parallel output, the first parallel input being connected to the parallel output of the seventh register 22, the second parallel input being connected to the parallel output of the eighth register 23;

a ninth Bt bit register 25 having one parallel input and one parallel output, the parallel input being connected to the parallel output of the eleventh multiplexer 24;

a second multiplication circuit 26 having one series input, one parallel input and one series output, the parallel input being connected to the parallel output of the ninth register 25, the series output being connected to the series input of the eighth register 23;

a twelfth multiplexer 27 having first to third inputs and one output, the first input receiving a logic "0", the second input being connected to the output of the first addition circuit 20, the output being connected to the series input of the second multiplication circuit 26;

a first delay circuit 28 having one input and one output, the input being connected to the output of the first addition circuit 20;

a second addition circuit 29 having first and second inputs, one result output and one carry output, the first input being connected to the series output of the second multiplication circuit 26, the second input being connected to the output of the first delay circuit 28;

thirteenth and fourteenth multiplexers 30 and 31, each having first and second inputs and one output, the first inputs of said multiplexers 30 and 31 being connected to the output of the eighth multiplexer 15, the second input of the thirteenth multiplexer 30 being connected to the carry output of the second addition circuit 29, the second input of the fourteenth multiplexer 31 being connected to the result output of the second addition circuit 29;

a second delay circuit 32 having one input and one output, the input being connected to the output of the seventh multiplexer 14, the output being connected to the third input of the twelfth multiplexer 27;

a third delay circuit 33 having one input and one output, the input being connected to the output of the second delay circuit 32;

a fifteenth multiplexer 34 having first and second inputs and one output, the first input being connected to the output of the seventh multiplexer 14, the second input being connected to the output of the third delay circuit 33;

a third subtraction circuit 35 having first and second inputs and one output, the first input being connected to the output of the fourteenth multiplexer 31, the second input being connected to the output of the fifteenth multiplexer 34;

a detection circuit 36 used to detect and store carry values, the detection circuit 36 having first and second inputs and first and second outputs, the first input being connected to the output of the thirteenth multiplexer 30, the second input being connected to the output of the third subtraction circuit 35, the first output being connected to the selection input of the fifth multiplexer 12 and to the third input of the tenth multiplexer 21, the second output being connected to the selection input of the sixth multiplexer 13;

a sixteenth multiplexer 37 having first to sixth inputs and one output, the first input being connected to the output of the seventh multiplexer 14, the second input being connected to the output of the first register 2, the third input being connected to the output of the eighth multiplexer 15, the fourth input being connected to the output of the second subtraction circuit 11, the fifth input being connected to the series output of the fifth register 17, the sixth input being connected to the series output of the seventh register 22, the output being connected to an output terminal Dout;

a seventeenth multiplexer 38 having first to third inputs and one output, the first input being connected to the output of the sixteenth register 37, the second input being connected to the first output of the detection circuit 36, the third input being connected to the output of the fourteenth multiplexer 31, the output being connected to the fourth inputs of the first to fourth multiplexers 6 to 9.

With regard to the making of the different elements of the coprocessor 1 as well as the working of this coprocessor 1 for modular computations, those skilled in the art may refer to the applications EP-A 601,907; EP-A 712,070; EP-A 712,071; EP-A 712,072; EP-A 784,262; and EP-A 785,503. The modifications made in the coprocessor however require a slight adaptation of the sequencing of the coprocessor with respect to the prior art, but do not change its overall functioning for modular arithmetic operations.

It will be recalled that k and Bt are integers. Bt corresponds to the size of the working base used for the implementation of the modular operations and is equal to 32 in the prior art referred to here above. It is also recalled that the data elements are loaded into the registers with the most significant bit on the serial input side and the least significant bit on the serial output side. It will be noted that the modifications relate essentially to the data paths that enable larger numbers of combinations and on the addition of the serial output on the fifth and seventh registers 17 and 22.

To explain the working of the coprocessor 1 for the performance of an integer division, reference may be made to the drawing of FIG. 2 which shows the same coprocessor 1 in simplified form. In this drawing of FIG. 2, only the elements, connections and inputs of multiplexers necessary for the implementation of an integer division have been shown. The following explanations will be easier to understand with reference to FIG. 2 but may also be understood with reference to FIG. 1. Those skilled in the art could make use of the explanations to carry out the appropriate sequencing of the circuit so that the operations described are performed.

Let us consider the following integer division A\N which may also be written as A=S*N+B, the back slash "\" designating the integer division, with A being an integer encoded on $\alpha$*Bt bits corresponding to the dividend, N being a non-zero integer encoded on n*Bt bits corresponding to the divider, S being an integer encoded on s*Bt bits corresponding to the quotient, and B being an integer encoded on b*Bt bits corresponding to the remainder. Also a, b, n and s are integers and determine the numbers of non-zero words of Bt bits needed to respectively encode A, B, N and S. At the beginning of a division, A and N are known.

Before performing a division, the processor associated with the coprocessor will assess the sizes of the numbers A and N to determine the values of a and n. Once $\alpha$ and n are known, it is necessary to compare $\alpha$ and n. If $\alpha<n$, then we obtain the obvious result without using the coprocessor 1 which is B=A and S=0. If $\alpha \geq n$ then the sizes of B and S are computed: b=n and s=$\alpha$-n+1. Then the coprocessor 1 is used to perform the division.

It is assumed first of all that the first to fourth registers 2 to 5 have a fixed size of k*Bt bits. We shall first of all distinguish a case where $\alpha \leq k$: the method of carrying out the integer division comprises the following steps:

E0: data initialization step: the data elements A and N are loaded respectively into the first and fourth register 2 and 5, the loading being done in an unspecified order by means of the terminal Din and the first and fourth multiplexers 6 and 9. B and S are initialized by the loading of zeros into the second and third registers 3 and 4 using second and third multiplexers 7 and 8.

E1: step for the initialization of the method: $\alpha$*Bt rightward shifts are made in the first register 2, the first register having its output looped to its input by means of the first multiplexer 6. During the $\alpha$*Bt shifts, the $\alpha^{th}$ Bt bit word is transferred into the fifth register 17 by means of the ninth multiplexer 16. Then Bt−1 rightward shifts are made in the fifth register 17. The first and third subtraction circuits 10 and 35 and the detection circuit 36 are initialized. The first output of the detection circuit displays a logic "0" to orient the output of the fifth multiplexer 12 on its first input. The second output of the detection circuit must remain at "0" throughout the computation period so that the sixth multiplexer 13 permanently connects its output to its first input. The seventh multiplexer 14 connects its output to its first input. The thirteenth and fourteenth multiplexers 30 and 31 connect their first inputs to their outputs. The fifteenth multiplexer 34 connects its output to its first input.

E2: performance of the division: the steps SE1 to SE6 defined here below are performed:

SE1: the contents of the first register 2 are shifted by (k−2)*Bt bits rightwards, its input being connected to the output by means of the first multiplexer 6.

SE2: the steps SB1 to SB6 defined here below are performed Bt times:

SB1: the second and fourth registers 3 and 5 are shifted rightwards by one bit by positioning the eighth multiplexer 15 so that the bit present at the output of this eighth multiplexer 15 is the bit present at the serial output of the fifth register 17. The second, sixteenth and seventeenth multiplexers 7, 37 and 38 are positioned in such a way that the bit present at the output of the eighth multiplexer 15 is loaded into the second register 3. At the same time, the least significant bit of N is subtracted from the bit output from the fifth register 17 in the third subtraction circuit 35. If the first output of the detection circuit displays a logic "0", then zero is subtracted from the bit that comes out of the second register 3 in the first subtraction circuit 10. If the first output of the detection circuit displays a logic "1", then the least significant bit of N is subtracted from the bit coming out of the second register 3 in the first subtraction circuit 10.

SB2: the second and fourth registers 3 and 5 are shifted rightwards by k*Bt−1 bits by positioning the eighth multiplexer 15 so that the bit present at the output of this eighth multiplexer 15 is equal to the bit present at the output of the first subtraction register 10. The second and seventeenth multiplexers 7 and 38 are positioned in such a way that the bit present at the output of the eighth multiplexer 15 is loaded into the second register 3 at each shift. During each shift, the bits of N coming out of the fourth register 5 are subtracted from the bits coming out of the fifth register 17 in the third subtraction circuit 35. If the first output of the detection circuit displays a logic "0", then zeros are subtracted from the bits that come out of the second register 3 in the first subtraction circuit 10. If the first output of the detection circuit displays a logic "1", then the bits of N coming out of the fourth register 5 are subtracted from the bits coming out of the second register 3 in the first subtraction circuit 10.

SB3: the eighth multiplexer 15 is positioned so as to obtain a logic "0" at its output. Then the carry value present at the output of the third subtraction circuit 35 is detected and stored in the detection circuit 36. The detection circuit 36 displays a logic "0" at its first input if there is a carry value at the output of the third subtraction circuit 35 (which corresponds to a case where the contents of the second register are smaller than N). At its first input, the detection circuit displays a logic "1" if there is no carry value at output of the third subtraction circuit 35 (which corresponds to a case where the contents of the second register are greater than N).

SB4: the contents of the seventh register 22 are shifted by one bit rightwards, the tenth multiplexer 21 directing the bit coming from the first output of the detection circuit 36 to its output.

SB5: the contents of the seventh register 22 are shifted rightwards by Bt−2 bits, its input being connected to its output by means of the tenth multiplexer 21.

SB6: the contents of the fifth register 17 are shifted by Bt−1 bits rightwards, its input being connected to its output by means of the ninth multiplexer 16.

SE3: the contents of the first and fifth registers 2 and 17 are shifted by Bt bits rightwards, the input of the first register 2 being connected to its output by means of the first multiplexer 6, and the input of the fifth register 17 being connected to the output of the first register 2 by means of the ninth multiplexer 16.

SE4: the contents of the fifth register 17 are shifted by Bt−1 bits rightwards, its input being connected to its output by means of the ninth multiplexer 16.

SE5: the contents of the third and seventh registers 4 and 22 are shifted by Bt bits rightwards, the input of the third register 4 being connected to the output of the seventh register 22 by means of the third, sixteenth and seventeenth multiplexers 8, 37 and 38.

SE6: the contents of the third register 4 are shifted by (k−2)*Bt bits rightwards, its input being connected to its output by means of the third multiplexer 8.

E3: the detection circuit 36 is initialized to position the fifth multiplexer 12 at its first input.

E4: the remainder B of the division is output in shifting the contents of the second register 3 by b*Bt bits rightwards, the output of the second register 3 being connected to the output terminal Dout by means of the first subtraction circuit 10 and the eighth and sixteenth multiplexers 15 and 37.

E5: the contents of the third register 4 are shifted by Bt bits rightwards, its input being connected to its output by means of the third multiplexer 8.

E6: the quotient S of the division is output by shifting the contents of the third register 4 by (α−n+1)*Bt bits rightwards, the output of the third register 4 being connected to the output terminal by means of the sixteenth multiplexer 37.

Those skilled in the art can carry out the different steps in the order given. However, to reduce the computation time, it is preferable to superimpose certain steps: the steps SE1 and SE2 may take place simultaneously; the step SB6 may take place during the step SB2 or SB3; the steps SB4 and SB5 may take place during the performance of the steps SB1 to SB3 which correspond to the next iteration; the step SE3 may take place during the step SE2 after the step SE1 has been performed; the step SE4 may take place during the step SE2 after the step SE3 has been performed; the step SE6 may take place during the step SE2 of the next iteration; and the step E5 may take place during the step E4.

Furthermore, the steps E0, E3, E4 and E6 are not obligatory: the data elements may be present in the coprocessor 1 and the initialization of B and S in the second and third registers 3 and 4 may take place during the first iteration of E2, rendering the step E0 superfluous. The quotient S or the remainder may be used in the coprocessor immediately after the performance of the division rendering superfluous the steps E3, E4 and E6 for the output of the results.

The performance of the division which corresponds to the performance of the steps E1, E2 and E5 (by superimposing the steps) uses $Bt*(\alpha*(k*Bt+4+x)+k-1$ clock cycles, x being a number of synchronization cycles due to the management of the coprocessor.

Improvements are possible on the basis of this method. It is possible to improve the processing capacity as well as the processing speed of the method by changing only certain parameters. Indeed, with a method as defined here above, the step E2 makes a loop in which the steps SE1 to SE6 are repeated a times. The (n−1) first iterations of the loop are used solely to transfer the n−1 most significant words of A into the second register since it is clear that the contents of the second register are smaller than N during these n−1 first iterations. One improvement includes replacing the steps E0, E1 and E2 of the method respectively by the following steps E0', E1' and E2':

E0: data initialization step: the n−1 most significant words of the dividend A are loaded into the second register 3 as less significant words, the k−n+1 most significant words of the second register 3 are loaded by logic "0", the α−n+1 less significant words of the dividend A are loaded into the first register 2 as less significant words, and the divider N is loaded into the fourth register 5, the loading being done in any order by means of the terminal Din and the first, second and fourth multiplexers 6, 7 and 9.

E1': step for the initialization of the method: $(\alpha-n+1)*Bt$ rightward shifts are performed in the first register 2, the first register having its output looped to its input by means of the first multiplexer 6. During the $(\alpha-n+1)*Bt$ shifts, the $(\alpha-n+1)^{th}$ word of Bt words is transferred into the fifth register 17 by means of the ninth multiplexer 16. Then Bt−1 rightward shifts are performed in the fifth register 17. The first and third subtraction circuits 10 and 35 and the detection circuit 36 are initialized. The first output of the detection circuit displays a logic "0" to orient the output of the fifth multiplexer 12 to its first input. The second output of the detection circuit must remain at "0" throughout the computation period so that the sixth multiplexer 13 permanently connects its output with its first input. The seventh multiplexer 14 connects its output to its first input. The thirteenth and fourteenth multiplexers 30 and 31 connect their first inputs to their outputs. The fifteenth multiplexer 34 connects its output to the first input.

E2': performance of the division: the steps SE1 to SE6 are performed α−n+1 times.

The steps SE1 to SE6 remain unchanged. Those skilled in the art will observe that the initialization of the third register 4 has also been eliminated. This initialization is not indispensable to the efficient operation of the method of division. The modifications made in the steps E0' to E2' enable the processing of the divisions for the numbers A and N such that $n \leq k$ and $\alpha \leq k+n-1$. The processing time of the division (steps E1', E2' and E5) is then equal to $Bt*((\alpha-n+1)*(k*Bt+4+x)+k)-1$ clock cycles.

To enable the processing of the dividends with a size greater than k−n+1, it is possible to successively load the α−n words of A directly into the fifth register 17. The steps E0, E1, E2 and SE3 may be respectively replaced by the following steps E0", E1", E2" and SE3":

E0": step for the initialization of the data elements: the n−1 most significant words of the dividend A are loaded into the second register 3 as less significant words, the k−n+1 most significant words of the second register 3 are loaded by logic "0", the (α−n+1)$^{th}$ word of the dividend A is loaded into the fifth register 17 and the divider N is loaded into the fourth register 5, the loading being done in any order by means of the terminal Din and the second, fourth and ninth multiplexer 7, 9 and 16.

E1": step for the initialization of the method: Bt−1 rightward shifts are performed in the fifth register 17. The first and third subtraction circuits 10 and 35 and the detection circuit 36 are initialized. The first output of the detection circuit displays a logic "0" to orient the output of the fifth multiplexer 12 to its first input. The second output of the detection circuit must remain at "0" throughout the computation period so that the sixth multiplexer 13 permanently connects its output with its first input. The seventh multiplexer 14 connects its output to its first input. The thirteenth and fourteenth multiplexers 30 and 31 connect their first inputs to their outputs. The fifteenth multiplexer 34 connects its output to the first input.

E2": performance of the division: the steps SE1, SE2, SE3" and SE4 to SE6 are performed α−n+1 times, i being an index varying from 1 to α−n+1 which gets incremented at each implementation of the step E2".

SE3": the (α−n+2−i)$^{th}$ word of the dividend A is loaded into the fifth register 17 by means of the ninth multiplexer 16 and the input terminal Din.

The processing capacity of the device then becomes dependent on the size of the divider N and the size of the quotient S. To make the processing capacity independent of the quotient S, it is possible to output words of the quotient S as and when the computation is done. For this purpose, the steps SE1, E5 and E6 are eliminated and the steps SE5 and SE6 are replaced by a single step SE5" as follows:

SE5": the contents of the seventh register 22 are shifted rightwards by Bt bits, the output of the seventh register 22 being connected to the output terminal by means of the sixteenth multiplexer 37.

The computation time, with the external management of the dividend A and the quotient S, becomes equal to Bt*((α−n+1)*(k*Bt+3+x)+1)−1 clock cycles.

As already explained in the various patent applications referred to here above, it is possible to use registers of variable size, for example, the variable size registers disclosed in FIG. 3 of the patent application EP-A 784,262. The variable size registers enable the use of the first to the fourth registers 2 to 5 whose size will be adapted to the data contained. These variable size registers can be combined with all the steps of the method described and all the improvements referred to. It is appropriate, for this purpose, to replace the factors k by α or α−n+1 for all that pertains to the first register 2, or to replace k by n for all that pertains to the second and fourth registers 3 and 5, or to replace k by α−n+1 for all that pertains to the third register 4.

The improvement provided by the variable size registers is expressed by the implementation time of:

Bt*(α*(n*Bt+5+x)+1−n)−1 clock cycles for the basic method;

Bt*(α−n+1)*(n*Bt+5+x)−1 clock cycles for the method using the steps E0', E1' and E2'; and Bt*((α−n+1)*(n*Bt+3+x)+1−1 clock cycles for the method using the steps E0", E1", E2", SE3" and SE5".

FIG. 3 shows a variable size shift register that is particularly valuable for the implementation of the invention. The shift register of FIG. 3 can be used for any one of the registers, from the first register to the fourth register 2 to 5.

Thus the first register 2 may be formed by k elementary Bt bit shift registers 39 to 42, each having one series input and one series output, all the inputs of the elementary registers 39 to 42 being connected together in order to form the input of the first register 2. An output multiplexer 43 has k inputs and one output, each of the inputs being connected respectively to the output of each of the elementary registers 39 to 42 and the output of the output multiplexer 43 forming the output of the first register 2.

The first register 2 of FIG. 3 needs control signals that tell it which of the elementary registers 39 to 42 is selected to perform a rightward shift making the input of the selected elementary register valid and/or connecting the output of the selected elementary register to the output of the first register 2. The first register 2 provides access independently to each of the Bt bit words of the data contained in the first register 2. It is furthermore possible to select two elementary registers 39 to 42 simultaneously by enabling the input of one of them and/or connecting the output of the other to the output of the first register 2.

The advantage of using the register of FIG. 3 is that it can be used to reduce the consumption of the coprocessor 1 if it is used for each of the first to fourth registers 2 to 5. Indeed, when it is desired to shift a word by k*Bt bits, for example in the second register 3, there will be a real shift in, at the most, two of the elementary registers 39 to 42. This reduces the number of shifts in the second register 3 by k/2 times, and thus reduces the consumption of the second register 3 by k/2 times.

In the method of division of the invention, the register of FIG. 3 has an additional advantage. Since the first and third registers 2 and 4 are made to give and receive their contents by k bit words, and since the fifth and seventh registers 17 and 22 are used to reverse the order of the bits of each of the words of Bt bits, the use of the register of FIG. 3 makes it possible to avoid having to systematically shift the contents of the first and third registers. Furthermore, the use of the fifth and seventh registers 17 and 22 is no longer obligatory for it is possible to carry out the reversal of the Bt bit words by means of the elementary registers 39 to 42 of the first and third registers 2 and 4 (for this purpose an additional connection is needed between the output of the first register 2 and the eighth multiplexer 15).

One variant includes the use of the fifth and seventh registers 17 and 22 capable of performing shifts in both directions, the input of these fifth and seventeenth registers 17 and 22 becoming an input/output, the reversal of the bits being done without rotation of all the contents of these registers. However, an approach of this kind requires greater adaptation in terms of chip surface area for an equivalent result.

Another variant may include the use of the seventh register 17 without using the first register 2. The loading of the dividend A is then done word-by-word during the performance of a division. The advantage of such a device is that it enables a division with the prior art circuits which have only three registers of k*Bt bits without being required to add a fourth register of k*Bt bits. It is preferable, in a variant of this kind, to convert the sixth register 18 into a shift register so that it fulfils the role of the seventh register 17 for the reversal of the bits, the seventh register 17 being then used as a buffer register to enable greater flexibility during the loading of data.

Other alternative embodiments are possible. For example, the different variants presented here above may be used in a combined fashion.

It is also possible for those skilled in the art to have need to reverse solely the bits of the quotient S or solely the bits of the dividend in such a way that the reversals of bits in the first and/or second registers 2 and/or 17 do not have to be done if an already reversed dividend is available or that the reversals of bits in the third and/or seventh registers 4 and/or 22 do not have to be done if it is desired to use the quotient S in a reversed form. Clearly, those skilled in the art can use a working base Bt, and first to fourth registers 2 to 5 of any size.

That which is claimed is:

1. A method for implementing an integer division in a modular arithmetic coprocessor, the division relating to a dividend A, encoded on $\alpha$ words of Bt bits, divided by a divider N, encoded on n words of Bt bits, to obtain a quotient S, encoded on $\alpha-n+1$ words of Bt bits, the method comprising the steps of:

entering at least one word of Bt bits of the dividend A bit-by-bit into a dividend shift register in a first order; and outputting the at least one word of Bt bits of the dividend A from the dividend shift register bit-by-bit in an order that is a reverse of the first order.

2. A method according to claim 1, wherein the step of outputting comprises the step of having the dividend shift register perform a Bt−1 bit shift Bt times, a first bit shift of each of the Bt−1 shifts bringing about output of one bit of the dividend A, and the dividend shift register having an input connected to an output thereof during each of the Bt−1 bit shifts.

3. A method according to claim 1, further comprising the step of having the dividend shift register receive successively Bt bit words of the dividend A, each of the words having a lower place value than a previously received word, the steps of entering and outputting being repeated for each word of dividend A.

4. A method according to claim 1, wherein a plurality of dividend shift registers each receive a Bt bit word of the dividend A.

5. A method according to claim 1, wherein the dividend shift register is a Bt bit dividend shift register.

6. A method for implementing an integer division in a modular arithmetic coprocessor, the division relating to a dividend A, encoded on $\alpha$ words of Bt bits, divided by a divider N, encoded on n words of Bt bits, to obtain a quotient S, encoded on $\alpha-n+1$ words of Bt bits, the method comprising the steps of:

entering at least one word of Bt bits of the quotient S bit-by-bit into a quotient shift register in a first order; and outputting the at least one word of Bt bits of the quotient S from the quotient shift register bit-by-bit in an order that is a reverse of the first order.

7. A method according to claim 6, wherein the step of entering comprises having the quotient shift register perform a Bt−1 bit shift Bt times, the first shift bringing about entry of one bit of the quotient S and the output of the quotient shift register being connected to the input of the quotient shift register during the following Bt−2 shifts.

8. A method according to claim 6, further comprising the step of having the quotient shift register receive successively $\alpha-n+1$ words of Bt bits of the quotient S, each of the words having a lower place value than a previously received word, and repeating the steps of entering and outputting for each word of quotient S.

9. A method according to claim 6, wherein a plurality of Bt bit quotient shift registers each receive a Bt bit word of the quotient S.

10. A method according to claim 6, wherein the quotient shift register is a Bt bit quotient shift register.

11. A method for implementing an integer division in a modular arithmetic coprocessor, the division relating to a dividend A, encoded on $\alpha$ words of Bt bits, divided by a divider N, encoded on n words of Bt bits, to obtain a quotient S, encoded on $\alpha-n+1$ words of Bt bits, the method comprising the steps of:

entering at least one word of Bt bits of the dividend A bit-by-bit into a dividend shift register in a first order;

outputting from the dividend shift register bit-by-bit in an order that is a reverse of the first order;

entering at least one word of Bt bits of the quotient S bit-by-bit into a quotient shift register in a first order; and outputting from the quotient shift register bit-by-bit in an order that is a reverse of the first order.

12. A method according to claim 11, further comprising the steps of:

having the dividend shift register perform a Bt−1 bit shift Bt times by having an input connected to an output thereof; and outputting contents of dividend shift register bit-by-bit after each of the Bt−1 bit shifts.

13. A method according to claim 11, further comprising the step of having the dividend shift register receive successively Bt bit words of the dividend A, each of the words having a lower place value than a previously received word.

14. A method according to claim 11, wherein a plurality of dividend shift registers each receive a Bt bit word of the dividend A.

15. A method according to claim 11, wherein the dividend shift register is a Bt bit dividend shift register.

16. A method according to claim 11, further comprising the step of having the quotient shift register perform a Bt−1 bit shift Bt times, the first shift bringing about entry of one bit of the quotient S and the output of the quotient shift register being connected to the input of the quotient shift register during the following Bt−2 shifts.

17. A method according to claim 11, further comprising the step of having the quotient shift register receive successively $\alpha-n+1$ words of Bt bits of the quotient S, each of the words having a lower place value than a previously received word.

18. A method according to claim 11, wherein a plurality of Bt bit quotient shift registers each receive a Bt bit word of the quotient S.

19. A method according to claim 11, wherein the quotient shift register is a Bt bit quotient shift register.

20. A modular arithmetic coprocessor comprising:

a division circuit to perform an integer division of a dividend A, encoded on a words of Bt bits, by a divider N, encoded on n words of Bt bits, to obtain a quotient S, encoded on $\alpha-n+1$ words of Bt bits;

said division circuit comprising at least one dividend shift register, to contain at least one word of the dividend A so that the word of the dividend A is entered in a first order and so as to output the word of the dividend A in an order that is the reverse of the first order.

21. A coprocessor according to claim 20, further comprising a dividend multiplexer to connect an output of said at least one dividend shift register and to an input of said at least one dividend shift register to reverse the order of output of the bits contained in said at least one dividend shift register by rotation of the contents of said at least one dividend shift register.

22. A coprocessor according to claim 20, wherein said at least one dividend shift register comprises a Bt bit dividend shift register.

23. A coprocessor according to claim 20, wherein said at least one quotient shift register comprises a Bt bit quotient shift register.

24. A modular arithmetic coprocessor comprising;
   a division circuit to perform an integer division of a dividend A, encoded on $\alpha$ words of Bt bits, by a divider N, encoded on n words of Bt bits, to obtain a quotient S, encoded on $\alpha-n+1$ words of Bt bits;
   said division circuit comprising at least one quotient shift register, to contain at least one word of the quotient S so that the word of the quotient S is entered in a first order and so as to output the word of the quotient S in an order that is the reverse of the first order.

25. A coprocessor according to claim 24, further comprising a dividend multiplexer to connect an output of said at least one quotient shift register to an input of said at least one quotient shift register to reverse the order of input of the bits contained in said at least one quotient shift register by rotation of the contents of said at least one quotient shift register.

26. A modular arithmetic coprocessor comprising:
   a division circuit to perform an integer division of a dividend A, encoded on $\alpha$ words of Bt bits, by a divider N, encoded on n words of Bt bits, to obtain a quotient S, encoded on $\alpha-n+1$ words of Bt bits;
   said division circuit comprising
      at least one dividend shift register, to contain at least one word of the dividend A so that the word of the dividend A is entered in a first order and so as to output the word of the dividend A in an order that is the reverse of the first order, and
      at least one quotient shift register, to contain at least one word of the quotient S so that the word of the quotient S is entered in a first order and so as to output the word of the quotient S in an order that is the reverse of the first order.

27. A coprocessor according to claim 26, further comprising a dividend multiplexer to connect an output of said at least one dividend shift register and to an input of said at least one dividend shift register to reverse the order of output of the bits contained in said at least one dividend shift register by rotation of the contents of said at least one dividend shift register.

28. A coprocessor according to claim 26, wherein said at least one dividend shift register comprises a Bt bit dividend shift register.

29. A coprocessor according to claim 26, further comprising a dividend multiplexer to connect an output of said at least one quotient shift register to an input of said at least one quotient shift register to reverse the order of input of the bits contained in said at least one quotient shift register by rotation of the contents of said at least one quotient shift register.

30. A coprocessor according to claim 26, wherein said at least one quotient shift register comprises a Bt bit quotient shift register.

* * * * *

UNITED STATES PATENT AND TRADEMARK OFFICE
CERTIFICATE OF CORRECTION

PATENT NO. : 6,212,538 B1
DATED : April 3, 2001
INVENTOR(S) : Bernard Plessier

It is certified that error appears in the above-identified patent and that said Letters Patent is hereby corrected as shown below:

Column 5,
Line 56, delete, "a, b, n" insert -- α, b, n --
Line 62, delete, "a and n." insert -- α and n. --

Column 8,
Line 23, delete, "a times." insert -- α times. --
Line 30, delete, "EO:" insert -- EO': --

Column 12,
Line 60, delete, "a words" insert -- α words --

Signed and Sealed this

Twenty-third Day of October, 2001

Attest:

NICHOLAS P. GODICI
*Attesting Officer*    *Acting Director of the United States Patent and Trademark Office*